UNITED STATES PATENT OFFICE.

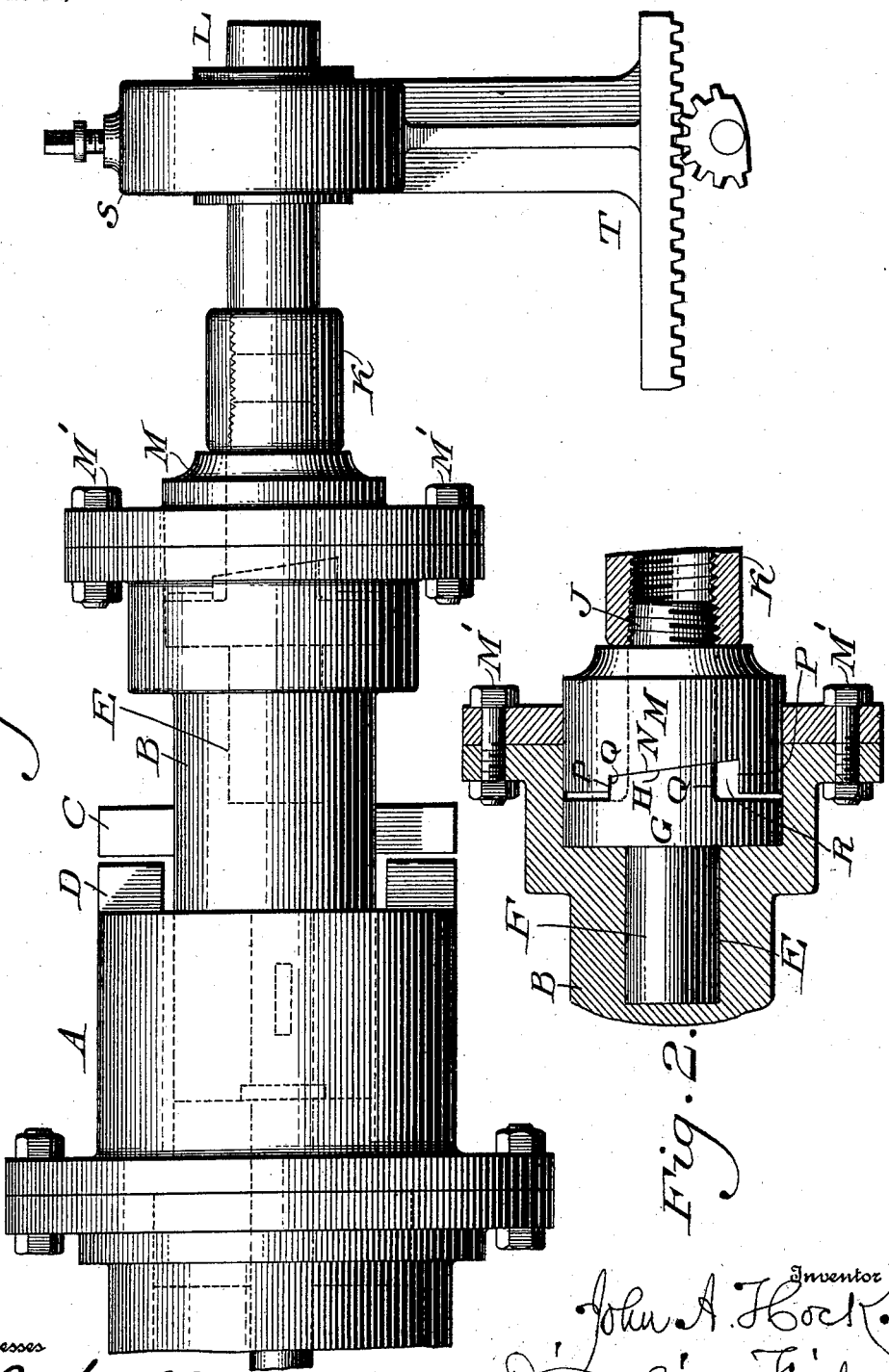

JOHN A. HOCK, OF CHESTER, PENNSYLVANIA.

MEANS FOR SCREWING SOCKETS UPON PIPES.

SPECIFICATION forming part of Letters Patent No. 673,339, dated April 30, 1901.

Application filed December 7, 1900. Serial No. 39,004. (No model.)

*To all whom it may concern:*

Be it known that I, JOHN A. HOCK, a citizen of the United States, residing at Chester, in the county of Delaware, State of Pennsylvania, have invented a new and useful Improvement in Means for Screwing Sockets upon Pipes, of which the following is a specification.

My invention consists of means for holding and manipulating a socket whereby it may be forcibly screwed on a pipe, as will be hereinafter set forth.

Figure 1 represents a side elevation of a machine embodying my invention for securing a socket upon a pipe. Fig. 2 represents a longitudinal section of a portion thereof.

Similar letters of reference indicate corresponding parts in the figures.

Referring to the drawings, A designates a chuck in which is mounted the rotatable spindle B, which latter is provided with lugs C, which may be coupled with the lugs D of said chuck, so that the motion of the latter may be imparted to said spindle. Within the spindle is a longitudinally-extending recess E, which freely receives the plug F, which is connected with the back of the head G, which also occupies said recess and has a front face wedge-shaped, as at H, from which face there projects forwardly the threaded stud J, the latter being adapted to enter the socket K, which is to be screwed upon the pipe L. M designates a collar which occupies a portion of said recess in the spindle B and is connected by the bolts M' with the outer end of the spindle B, so as to rotate with the same, it having its inner face wedge-shaped, as at N, the same being adapted to engage with the wedge-shaped face H of the head G, it being noticed that the shoulders P Q of the opposite wedge-shaped faces are separated somewhat from each other, so that a space R exists between said faces, it being also noticed that the collar M freely encircles a portion of the stud J.

The operation is as follows: The socket is partly screwed upon the pipe, the latter being held by the grip S on the carriage T, which is now advanced toward the collar M and the stud partly screwed into the socket, so as to sustain the same on the end opposite to the pipe. Power is now applied to the spindle whereby rotation is imparted to the collar M, so that owing to the wedge-shaped faces it is advanced to a certain extent against the socket. The shoulders P Q gradually abut, and so the head G is "picked up" and rotated with the collar M, whereby the latter tightens against the socket and the stud J is screwed to a slightly-greater extent into the socket, thus firmly jamming the collar and stud with the socket and carrying around the latter, so that it is powerfully screwed upon the pipe L. When the socket is "home" upon the pipe, the spindle is reversed, the collar then rotating and leaving the socket K so as to release it therefrom, after which the head G is engaged by the collar, owing to the shoulders of said parts, when the stud is rotated so as to unscrew from the socket K. The carriage is now run back, when the pipe may be removed and another pipe applied, the operation then being repeated.

Having thus described my invention, what I claim as new, and desire to secure by Letters Patent, is—

1. A screw-stud, a collar through which said stud freely passes, and a head carrying said stud, said collar and the head of said stud having wedging faces in combination with a spindle in which said head is freely mounted and with which said collar is connected.

2. A spindle and means for rotating the same, a head mounted freely therein, a screw-stud extending from said head, and a collar freely encircling said stud and being connected with said spindle, the faces of said collar and head being wedging.

3. A spindle, a head provided with a plug freely fitted in said spindle, a screw-stud projecting from said head, a collar connected with said spindle and freely encircling said stud, and wedging faces and shoulders on said collar and head.

4. A spindle, a head provided with a plug freely fitted in said spindle, a screw-stud projecting from said head, a collar connected with said spindle and freely encircling said stud, wedging faces and shoulders on said collar and head, and a chuck in which said spindle is mounted and with which it is engageable.

JOHN A. HOCK.

Witnesses:
JOHN A. WIEDERSHEIM,
C. D. MCVAY.